US012353155B2

(12) United States Patent
Iwami et al.

(10) Patent No.: US 12,353,155 B2
(45) Date of Patent: Jul. 8, 2025

(54) STATIC ELIMINATION APPARATUS AND IMAGE FORMING SYSTEM

(71) Applicant: CANON KABUSHIKI KAISHA, Tokyo (JP)

(72) Inventors: Shingo Iwami, Tokyo (JP); Ryo Aihara, Chiba (JP); Ryo Nakanishi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/424,258

(22) Filed: Jan. 26, 2024

(65) Prior Publication Data

US 2024/0255883 A1 Aug. 1, 2024

(30) Foreign Application Priority Data

Jan. 30, 2023 (JP) ................................ 2023-011450

(51) Int. Cl.
*G03G 15/00* (2006.01)
*B65H 29/12* (2006.01)

(52) U.S. Cl.
CPC ......... *G03G 15/6573* (2013.01); *B65H 29/12* (2013.01); *B65H 2301/5133* (2013.01); *G03G 2215/00421* (2013.01)

(58) Field of Classification Search
CPC ..... G03G 15/6573; G03G 2215/00421; B65H 29/12; B65H 2301/5133
See application file for complete search history.

(56) References Cited

U.S. PATENT DOCUMENTS

2010/0128097 A1* 5/2010 Sootome ................ B65H 5/004 271/265.01
2017/0308010 A1* 10/2017 Okajima ............ G03G 15/2053
2021/0216027 A1* 7/2021 Tanaka ............... G03G 15/6573
2021/0216031 A1* 7/2021 Tanaka ............... G03G 15/6535
2022/0334522 A1* 10/2022 Miyahara ........... G03G 15/2017

FOREIGN PATENT DOCUMENTS

JP 2021111527 A 8/2021

* cited by examiner

*Primary Examiner* — David H Banh
(74) *Attorney, Agent, or Firm* — Canon U.S.A., Inc. IP Division

(57) ABSTRACT

A static elimination apparatus includes a conveyance unit configured to convey a sheet along a conveyance path, a non-contact static elimination unit arranged above the conveyance path and configured to eliminate static electricity from the sheet in a non-contact state, an upper side guide member arranged to face an upper surface of the sheet and configured to form part of the conveyance path, a lower side guide member arranged to face a lower surface of the sheet and configured to form the conveyance path together with the upper side guide member, a lower side unit in which the lower side guide member is arranged, and an upper side unit in which the non-contact static elimination unit is arranged and that is configured to be rotated upward with respect to the lower side unit to make at least part of the conveyance path exposed.

11 Claims, 8 Drawing Sheets

STATIC ELIMINATION APPARATUS AND IMAGE FORMING SYSTEM

BACKGROUND

Field

The present disclosure relates to a static elimination apparatus that eliminates static electricity from a sheet and an image forming system including the static elimination apparatus.

Description of the Related Art

As an image forming apparatus such as a copy machine, there is known a conventional image forming apparatus that transfers a toner image formed in an image forming unit to a sheet in a transfer unit, fixes the toner image to the sheet in a fixing unit, and thereafter stacks the sheet in a discharge tray. In such an image forming apparatus, there is a case where discharged sheets stick to each other due to electrostatic force between the sheets. To address this issue, there has been proposed an image forming system including a static elimination apparatus for eliminating static electricity from a sheet on which an image is formed. Japanese Patent Application Laid-Open No. 2021-111527 discusses an image forming device including static elimination rollers as a contact-type static eliminator that eliminates static electricity from a sheet while being in contact with the sheet, and a discharge wire as a non-contact-type static eliminator that eliminates static electricity in a state of being not in contact with the sheet.

For example, in a case where a jam (paper jam) occurs on a conveyance path of a static elimination device discussed in Japanese Patent Application Laid-Open No. 2021-111527, a possible configuration of removing the jammed sheet includes a configuration of manually rotating the static elimination rollers to send the sheet downstream in a conveyance direction. However, in a case of such a configuration, an operator needs to manually send the sheet downstream, and there is an issue that a jam clearance operation becomes cumbersome.

SUMMARY

The present disclosure is directed to a technique of facilitating a jam clearance operation on a static elimination apparatus.

According to an aspect of the present disclosure, a static elimination apparatus includes a conveyance unit configured to convey a sheet along a conveyance path, a non-contact static elimination unit arranged above the conveyance path and configured to eliminate static electricity from the sheet conveyed by the conveyance unit in a non-contact state, an upper side guide member arranged so as to face an upper surface of the sheet conveyed by the conveyance unit and configured to form part of the conveyance path, a lower side guide member arranged so as to face a lower surface of the sheet conveyed by the conveyance unit and configured to form the conveyance path together with the upper side guide member, a lower side unit in which the lower side guide member is arranged, and an upper side unit in which the non-contact static elimination unit is arranged and that is configured to be rotated upward with respect to the lower side unit so as to make at least part of the conveyance path exposed.

According to another aspect of the present disclosure, a static elimination apparatus includes a conveyance unit configured to convey a sheet along a conveyance path, a static elimination roller pair including a first static elimination roller configured to rotate while being in contact with an upper surface of the sheet and a second static elimination roller configured to form a nip portion together with the first static elimination roller and rotate while being in contact with a lower surface of the sheet, and configured to eliminate static electricity from the sheet in a state of being in contact with the sheet conveyed by the conveyance unit, an upper side guide member arranged so as to face the upper surface of the sheet conveyed by the conveyance unit and configured to form part of the conveyance path, a lower side guide member arranged so as to face the lower surface of the sheet conveyed by the conveyance unit and configured to form the conveyance path together with the upper side guide member, a lower side unit in which the second static elimination roller and the lower side guide member are arranged, and an upper side unit in which the first static elimination roller is arranged and that is configured to be rotated upward with respect to the lower side unit so as to make at least part of the conveyance path exposed, wherein the first static elimination roller is configured to be separated from the second static elimination roller when the upper side unit is rotated upward.

Further features of the present disclosure will become apparent from the following description of exemplary embodiments with reference to the attached drawings.

DESCRIPTION OF THE EMBODIMENTS

An exemplary embodiment according to the present disclosure will be described below with reference to the attached drawings. Dimensions, materials, shapes, and relative arrangement of components, and the like described in the following exemplary embodiment are not intended to limit the scope of application of the present technology unless specifically described.

<Image Forming System>

Figure 1:
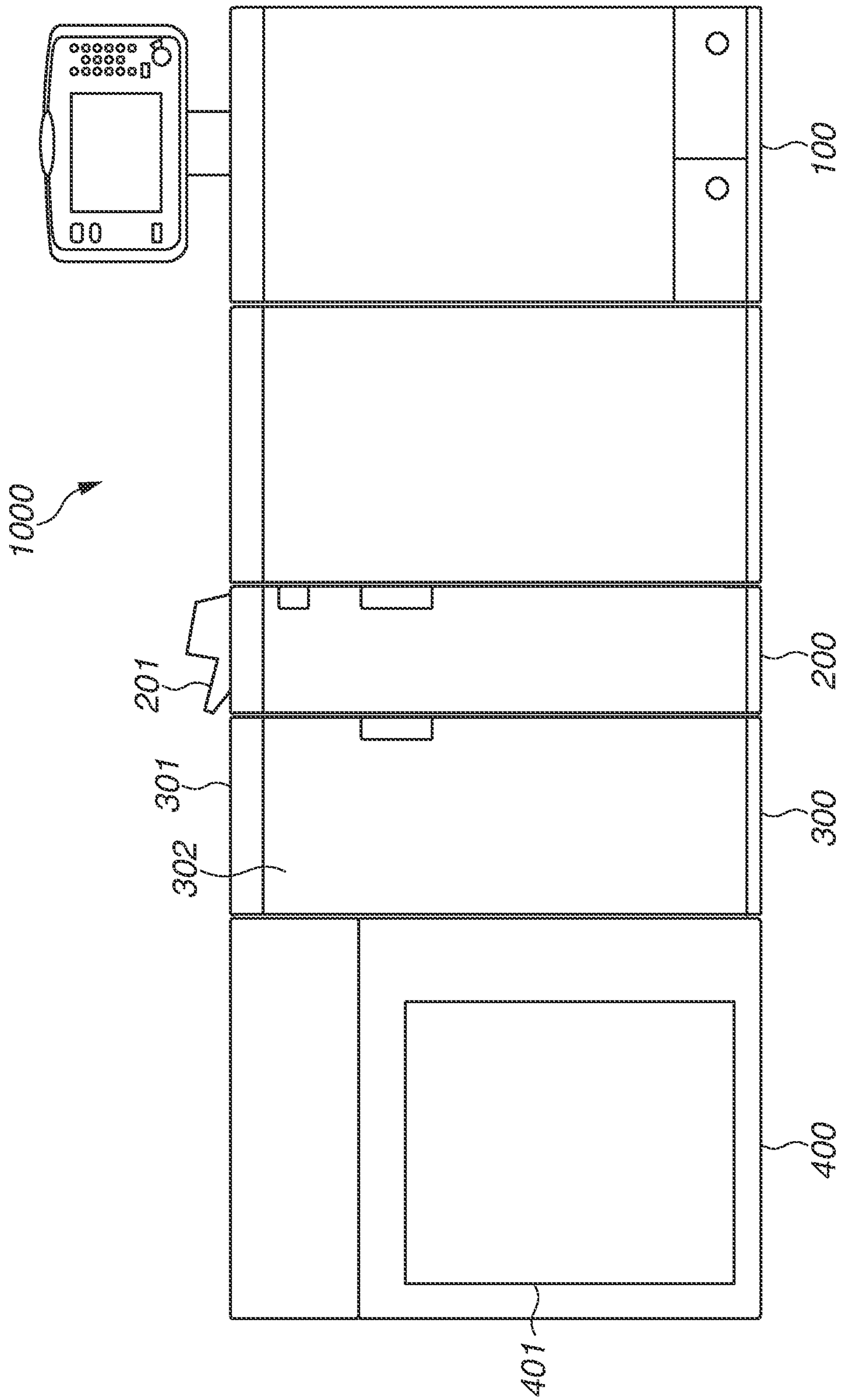
FIG. 1 is an overall view of an image forming system.

FIG. 1 is an overall view illustrating a hardware configuration of an image forming system 1000 according to an exemplary embodiment. The image forming system 1000 includes an image forming apparatus 100, an inserter 200, a static elimination apparatus (charge eliminating apparatus) 300, and a high-capacity stacker 400. The image forming apparatus 100 forms an image on a sheet based on an instruction from an external apparatus. The inserter 200 conveys a sheet conveyed from the image forming apparatus 100 to the static elimination apparatus 300. In addition, the inserter 200 can feed a sheet inserted from a feeding tray 201, and insert the inserted sheet between a plurality of sheets conveyed from the image forming apparatus 100. The static elimination apparatus 300 eliminates static electricity from a sheet conveyed from the image forming apparatus 100 via the inserter 200. The high-capacity stacker 400 is a high-capacity stacker in which a sheet conveyed from the static elimination apparatus 300 is stacked. A sheet that is conveyed from the image forming apparatus 100 after passing the inserter 200 and the static elimination apparatus 300 is discharged to a discharge tray 401 of the high-capacity stacker 400.

The image forming system 1000 according to the present exemplary embodiment includes the image forming apparatus 100, the inserter 200, the static elimination apparatus 300, and the high-capacity stacker 400, but the configuration of the image forming system 1000 is not limited thereto. For example, the image forming system 1000 may include another finisher on the downstream side of the high-capacity stacker 400. Alternatively, the image forming system 1000 may have a configuration in which the static elimination apparatus 300 is directly connected to the image forming apparatus 100, and the inserter 200 and the high-capacity stacker 400 are not included. Still alternatively, the image forming system 1000 may have a configuration in which the static elimination apparatus 300 is integrally arranged inside a housing 110 (FIG. 2) of the image forming apparatus 100.

<Image Forming Apparatus>

Figure 2:
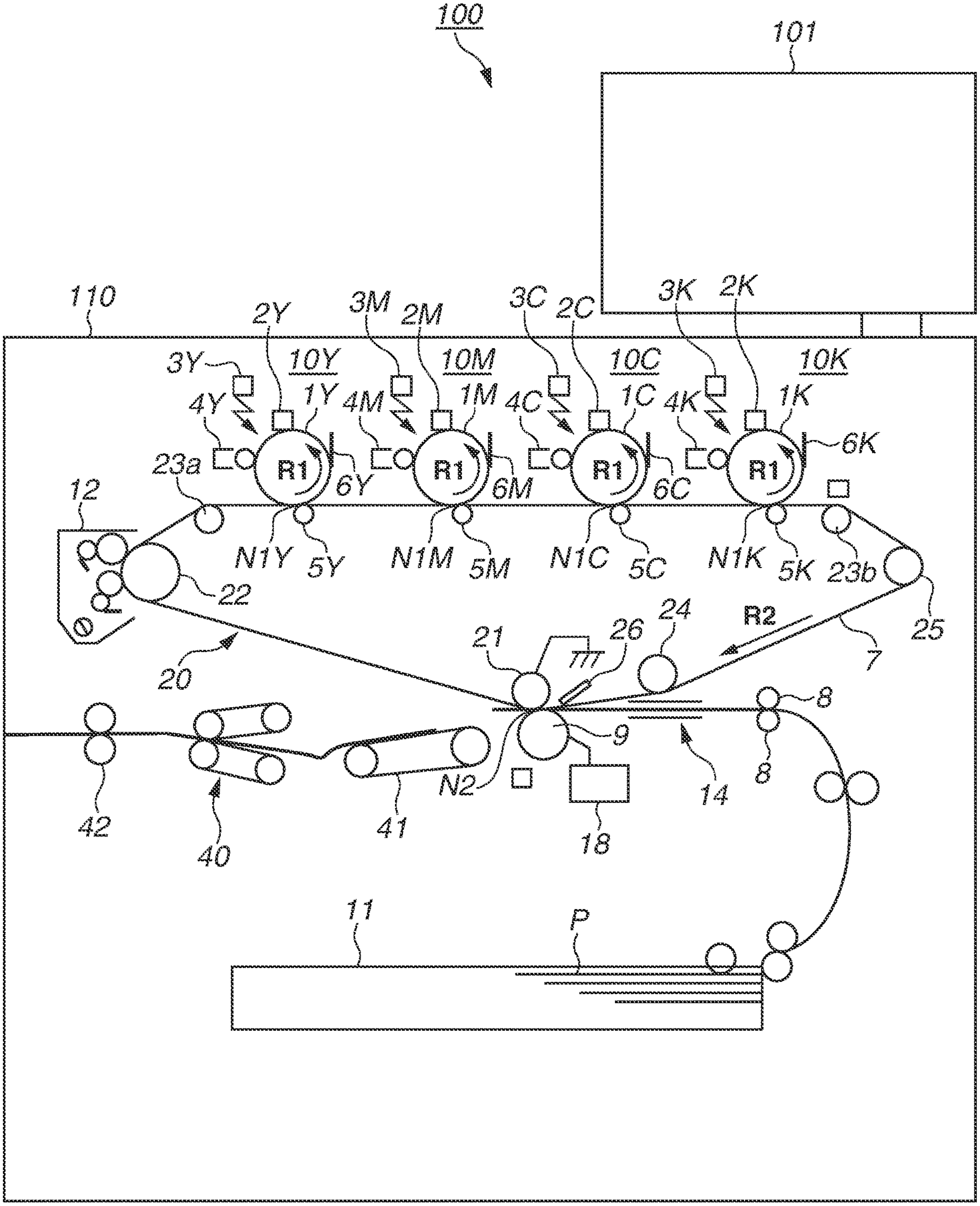
FIG. 2 is a cross-sectional view schematically illustrating an image forming apparatus.

FIG. 2 is a cross-sectional view schematically illustrating the image forming apparatus 100. The image forming apparatus 100 according to the present exemplary embodiment is a tandem-type multi-function peripheral adopting an intermediate transfer method (including functions of a copy machine, a printer, and a facsimile). The image forming apparatus 100 is capable of, for example, forming a full color image on a sheet (transfer material, sheet material, recording medium, and medium) P, such as paper, using an electrophotographic method in response to an image signal transmitted from the external apparatus.

The image forming apparatus 100 includes, as a plurality of image forming units (stations), four image forming units 10Y, 10M, 10C, and 10K that form respective images in yellow (Y), magenta (M), cyan (C), and black (K). These image forming units 10Y, 10M, 10C, and 10K are arranged in a line along a movement direction of an image transfer surface of an intermediate transfer belt 7 arranged in a substantially horizontal manner. The intermediate transfer belt 7 will be described below. Respective components having identical or corresponding functions or configurations in the image forming units 10Y, 10M, 10C, and 10K may be collectively described without Y, M, C, and K, which are the reference signs indicating respective colors, at the ends of the reference numerals. The image forming unit 10 includes a photosensitive drum 1 (1Y, 1M, 1C, and 1K), a charger 2 (2Y, 2M, 2C, and 2K), an exposure device 3 (3Y, 3M, 3C, and 3K), a developing device 4 (4Y, 4M, 4C, and 4K), a primary transfer roller 5 (5Y, 5M, 5C, and 5K), and a cleaning device 6 (6Y, 6M, 6*c*, and 6K).

The photosensitive drum 1 is a rotatable photosensitive member in a drum shape (cylindrical shape) and serves as a first image bearing member that bears a toner image. The photosensitive drum 1 receives drive force transmitted from a drum drive motor, which is not illustrated, and is rotationally driven in a direction of arrow R1 (counterclockwise) in FIG. 2. The surface of the rotating photosensitive drum 1 is uniformly subjected to charging processing to have a predetermined potential of a predetermined polarity (negative polarity in the present exemplary embodiment) by the charger 2 which serves as a charging unit. At the time of charging processing, a predetermined charging voltage is applied to the charger 2 by a charging power source, which is not illustrated. The surface of the photosensitive drum 1 subjected to the charging processing is then subjected to scan exposure in accordance with an image signal by the exposure device 3 which serves as an exposure unit, and an electrostatic-latent image is formed on the photosensitive drum 1. In the present exemplary embodiment, the exposure device 3 is configured as a laser scanner device that irradiates the photosensitive drum 1 with laser light that is modulated in accordance with image information. An electrostatic image formed on the photosensitive drum 1 is developed with toner as a developer being supplied by the developing device 4 as a developing unit, whereby a toner image is formed on the photosensitive drum 1. In the present exemplary embodiment, toner, which is charged to the same polarity as the charging polarity of the photosensitive drum 1, adheres to an exposure portion on the photosensitive drum 1 whose absolute value of the potential has been decreased by being exposed after being uniformly charged. The developing device 4 includes a developing roller serving as a rotatable developer bearer that bears the developer and conveys the developer to a developing position, which is a portion facing the photosensitive drum 1. The developing roller is rotationally driven by, for example, drive force being transmitted thereto from a drive system of the photosensitive drum 1. At the time of development, a predetermined developing voltage is applied to the developing roller by a developing power source, which is not illustrated.

The intermediate transfer belt 7 is arranged so as to be opposed to the four photosensitive drums 1Y, 1M, 1C, and 1K. The intermediate transfer belt 7 serves as a rotatable intermediate transfer body constituted by an endless belt serving as a second image bearing member that bears a toner image. The intermediate transfer belt 7 is looped over a plurality of tension rollers including a drive roller 22, an upstream auxiliary roller 23*a*, a downstream auxiliary roller 23*b*, a tension roller 25, a secondary pre-transfer roller 24, and an inner roller 21, and is stretched with predetermined tension. The drive roller 22 transmits drive force to the intermediate transfer belt 7. The tension roller 25 applies predetermined tension to the intermediate transfer belt 7 and controls the tension of the intermediate transfer belt 7 to be constant. The secondary pre-transfer roller 24 forms the surface of the intermediate transfer belt 7 near the upstream side of a secondary transfer nip N2 in a rotational direction of the intermediate transfer belt 7. The inner roller 21 functions as an opposing member that is opposed to an outer roller 9. The upstream auxiliary roller 23*a* and the downstream auxiliary roller 23*b* form an image transfer surface to be arranged in a substantially horizontal manner. The drive roller 22 is rotationally driven by drive force being transmitted thereto from a belt drive motor, which is not illustrated. As a result, the drive force is input from the drive roller 22 to the intermediate transfer belt 7, and the intermediate transfer belt 7 is rotated in a direction of arrow R2 (clockwise direction) in FIG. 2. In the present exemplary embodiment, the intermediate transfer belt 7 is rotationally driven to move at a peripheral velocity of 150 to 470 mm/sec. Among the plurality of tension rollers, tension rollers other than the drive roller 22 are driven to rotate by the rotation of the intermediate transfer belt 7. The primary transfer rollers 5Y, 5M, 5C, and 5K, which are roller-shape primary transfer members as primary transfer units, are arranged on the inner circumferential surface side of the intermediate transfer belt 7 to correspond to the photosensitive drums 1Y, 1M, 1C, and 1K, respectively. The primary transfer rollers 5 press the intermediate transfer belt 7 toward the photosensitive drum 1, and form a primary transfer nip N1 as a primary transfer portion, which is a contact portion between the photosensitive drum 1 and the intermediate transfer belt 7. On the inner circumferential surface side of the intermediate transfer belt 7, a pressing member 26 is arranged on the upstream side of the inner roller 21 and on the downstream side of the secondary pre-transfer roller 24 in the rotational direction of the intermediate transfer belt 7. The pressing member 26 is in contact with the inner circumferential surface of the intermediate transfer belt 7, and presses the intermediate transfer belt 7 from the inner circumferential surface side toward the outer circumferential surface side.

As described above, the toner image formed on the photosensitive drum 1 is primarily transferred to the rotating intermediate transfer belt 7 at the primary transfer nip N1 by the action of the primary transfer roller 5. At the time of primary transfer, a primary transfer voltage, which is a direct voltage with a polarity (positive polarity in the present exemplary embodiment) opposite to a normal charging polarity of toner, is applied to the primary transfer roller 5 by the primary transfer power source, which is not illustrated. For example, at the time of formation of a full color image, toner images in respective colors of yellow, magenta, cyan, and black, which are formed on the respective photosensitive drums 1, are sequentially primarily transferred to the intermediate transfer belt 7 so as to be superimposed on an identical image forming area. In the present exemplary embodiment, the primary transfer nip N1 corresponds to an image forming position at which the toner image is formed on the intermediate transfer belt 7. The intermediate transfer belt 7 is an example of the rotatable endless belt that conveys the toner image borne at the image forming position.

The outer roller 9, which is a roller-shape secondary transfer member as a secondary transfer unit, is arranged on the outer circumferential surface side of the intermediate transfer belt 7 at a position opposing the inner roller 21. The outer roller 9 is pressed toward the inner roller 21 via the intermediate transfer belt 7, and forms the secondary transfer nip N2 as a secondary transfer portion, which is a contact portion between the intermediate transfer belt 7 and the outer roller 9. As described above, the toner image formed on the intermediate transfer belt 7 is secondarily transferred onto a sheet P, which is nipped by the intermediate transfer belt 7 and the outer roller 9, by the action of the outer roller 9 at the secondary transfer nip N2. At the time of secondary transfer, a secondary transfer voltage, which is a direct voltage with a polarity (positive polarity in the present exemplary embodiment) opposite to the normal charging polarity of toner and which is controlled to be a constant voltage, is applied to the outer roller 9 by a secondary transfer power source 18. In the present exemplary embodiment, for example, the secondary transfer voltage of +1 to +7 KV is applied, a secondary transfer current of +40 to +120 μA is caused to flow, whereby the toner image on the intermediate transfer belt 7 is secondarily transferred onto the sheet P. In the present exemplary embodiment, the inner roller 21 is electrically grounded (connected to the ground). Alternatively, the inner roller 21 is used as the secondary transfer member, the secondary transfer voltage with a polarity identical to the normal charging polarity of toner is applied to the inner roller 21, and the outer roller 9 may be used as an opposing electrode and electrically grounded.

The sheet P is conveyed to the secondary transfer nip N2 in synchronized timing with the toner image on the intermediate transfer belt 7. That is, the sheet P stored in a recording material cassette 11 as a recording material storing unit is conveyed by a feeding roller and the like to a registration roller 8, and is temporarily stopped. The sheet P is sent to the secondary transfer nip N2 by rotational driving of the registration roller 8 so that the toner image on the intermediate transfer belt 7 matches a desired image forming area on the sheet P at the secondary transfer nip N2. A conveyance guide 14 for guiding the sheet P to the secondary transfer nip N2 is arranged on the downstream side of the registration roller 8 and the upstream side of the secondary transfer nip N2 in the sheet conveyance direction of the sheet P.

The sheet P, to which the toner image is transferred, is conveyed to a fixing unit 40 as a fixing device by a pre-fixing conveyance unit 41. The pre-fixing conveyance unit 41 includes a belt body in a rotatable manner in a central portion in a width direction thereof that is orthogonal to the conveyance direction of the sheet P. The belt body is formed of a rubber material, such as ethylene propylene diene monomer (EPDM) rubber, having a width of 100 to 110 mm and a thickness of 1 to 3 mm. The pre-fixing conveyance unit 41 conveys the sheet P on the belt body. The belt body has a hole having a diameter of 3 to 7 mm and sucks air from the inner circumferential surface side, whereby bearing performance for bearing the sheet P is increased and conveyance performance for conveying the sheet P is stabilized. The fixing unit 40 fixes (melts and solidifies) the toner image to the surface of the sheet P by heating and pressing the sheet P in a process in which the sheet P that bears an unfixed toner image is interposed between a fixing rotary member pair. Thereafter, the sheet P to which the toner image is fixed is conveyed to the inserter 200 by an outlet roller pair 42.

Meanwhile, residual toner on the photosensitive drum 1 after the primary transfer is removed and collected from the photosensitive drum 1 by the cleaning device 6 as a cleaning means. In addition, residual toner on the intermediate transfer belt 7 after the secondary transfer or adhering materials, such as paper dusts, that adheres to the intermediate transfer belt 7 from the sheet P is removed and collected from the intermediate transfer belt 7 by a belt cleaning device 12 as an intermediate transfer body cleaning unit. In the present exemplary embodiment, the belt cleaning device 12 electrostatically collects the adhering materials on the intermediate transfer belt 7 such as the residual toner after the secondary transfer to clean the intermediate transfer belt 7.

In the present exemplary embodiment, an intermediate transfer belt unit 20 is configured as a belt conveyance device which includes the intermediate transfer belt 7 that is stretched by the plurality of tension rollers, the primary transfer rollers 5, the belt cleaning device 12, and a frame that supports these components. The intermediate transfer belt unit 20 is supported by the housing 110 of the image forming apparatus 100 such that the intermediate transfer belt unit 20 detachable from the housing 110 for maintenance or replacement. As the intermediate transfer belt 7 mentioned herein, it is possible to use an intermediate transfer belt formed of a resin material having a single layer structure or a multi-layer structure, an intermediate transfer belt having a multi-layer structure including an elastic layer formed of an elastic material, or the like.

In the present exemplary embodiment, the primary transfer roller 5 has a configuration in which an elastic layer formed of ion conductive foamed rubber is arranged on the outer circumference of a metal core. In the present exemplary embodiment, the primary transfer roller 5 has an outer diameter of 15 to 20 mm, and an electrical resistance value of the primary transfer roller 5 is $1\times10^5$ to $1\times10^8\Omega$ when measured by application of a voltage of 2 kV under the environment of 23° C. and a relative humidity of 50%.

In the present exemplary embodiment, the outer roller 9 has a configuration in which an elastic layer formed of ion conductive foamed rubber is arranged on the outer circumference of a metal core. In the present exemplary embodiment, the outer roller 9 has an outer diameter of 20 to 25 mm, and an electrical resistance value of the outer roller 9 is $1\times10^5$ to $1\times10^8\Omega$ when measured by application of a voltage of 2 kV under the environment of 23° C. and a relative humidity of 50%. The outer roller 9 is pressed against the inner roller 21 with a predetermined pressure with the intermediate transfer belt 7 interposed therebetween, and forms the secondary transfer nip N2.

In the present exemplary embodiment, the inner roller 21 has a configuration in which an elastic layer formed of electronically conductive rubber is arranged on the outer circumference of a metal core. In the present exemplary embodiment, the inner roller 21 has an outer diameter of 20 to 22 mm, and an electrical resistance value of the inner roller 21 is $1\times10^5$ to $1\times10^8\Omega$ when measured by application of a voltage of 50 V under the environment of 23° C. and a relative humidity of 50% RH. The secondary pre-transfer roller 24 can have, for example, a configuration similar to that of the inner roller 21. In the present exemplary embodiment, respective rotational axis line directions of the tension rollers for the intermediate transfer belt 7 including the inner roller 21 and that of the outer roller 9 are substantially parallel to each other.

<Static Elimination Apparatus>

Figure 3:
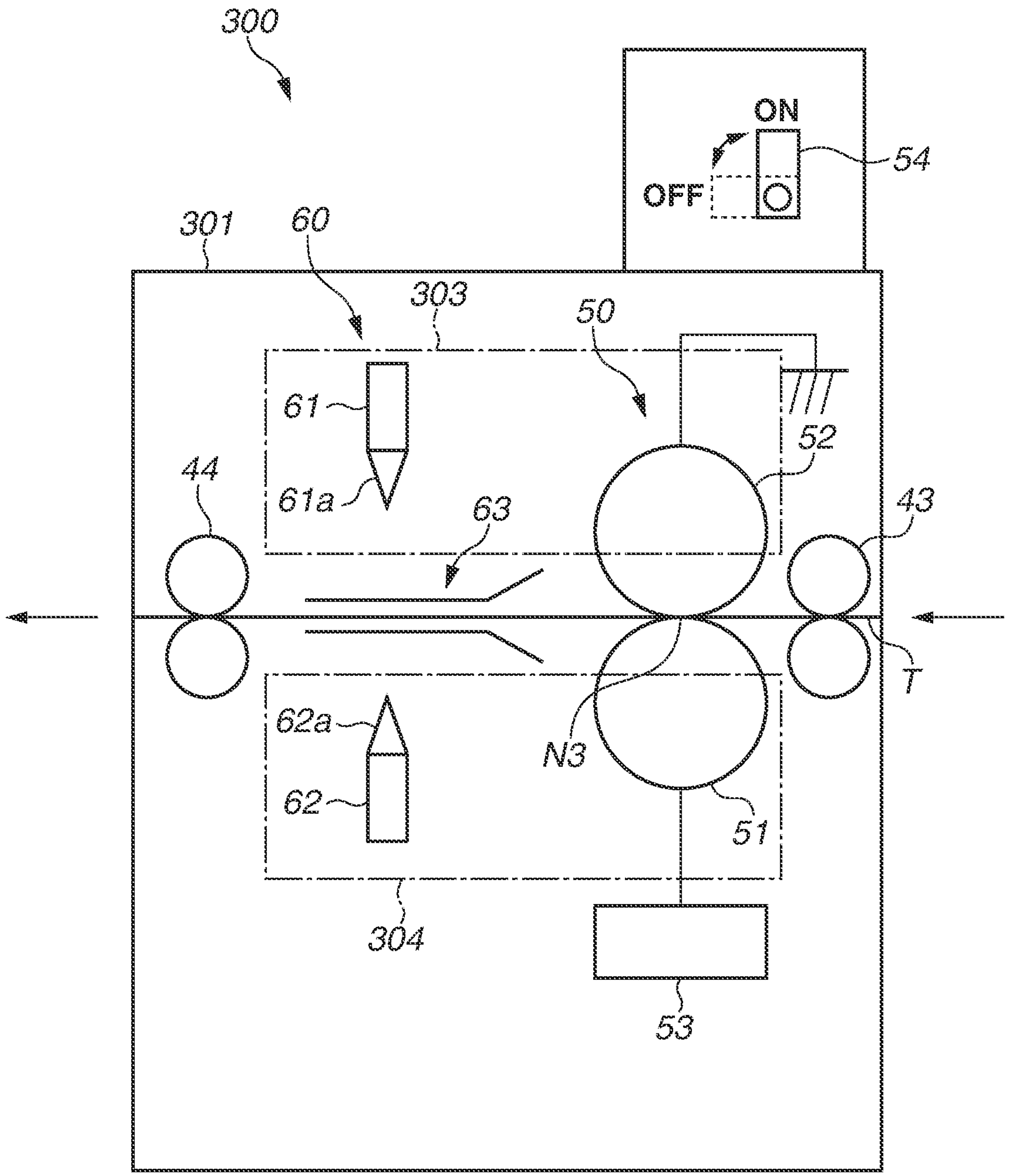
FIG. 3 is a cross-sectional view schematically illustrating a static elimination apparatus.

Subsequently, the static elimination apparatus 300 according to the present exemplary embodiment is described with reference to FIG. 3. FIG. 3 is a cross-sectional view schematically illustrating the static elimination apparatus 300. In the image forming system 1000, the static elimination apparatus 300 is arranged on the downstream side of the image forming apparatus 100 and the inserter 200. There is a case where the sheet P is charged during the above-mentioned image forming process in the image forming apparatus 100. In such as case, there is a possibility that a plurality of sheets P discharged to the discharge tray 401 sticks to each other due to static electricity, which can lead to a stacking failure. To address this, in the present exemplary embodiment, the static elimination apparatus 300 is configured to eliminate static electricity from the sheet P on which the image is formed by the image forming apparatus 100.

The static elimination apparatus 300 includes a static elimination roller pair 50 as a contact static elimination unit that eliminates static electricity from a sheet in a state of being in contact with the sheet (contact state), and a non-contact static elimination section 60 that eliminates static electricity in a state of being not in contact with the sheet (non-contact state). The static elimination apparatus 300 also includes an inlet roller pair 43 that receives a sheet from the inserter 200 and conveys the sheet along a conveyance path T, and an outlet roller pair 44 that discharges the sheet, from which static electricity is eliminated by the static elimination roller pair 50 and the non-contact static elimination section 60, to the high-capacity stacker 400. The inlet roller pair 43 and the outlet roller pair 44 are each an example of a conveyance unit according to the present exemplary embodiment.

The static elimination roller pair 50 includes a static elimination roller 51 that rotates while being in contact with a lower surface of the sheet, and a static elimination opposing roller 52 that rotates while being in contact with an upper surface of the sheet. The static elimination opposing roller 52 is an example of a first static elimination roller, and the static elimination roller 51 is an example of a second static elimination roller. The static elimination roller 51 has a configuration in which an elastic layer formed of ion conductive foamed rubber is arranged on the outer circumference of a metal core. In the present exemplary embodiment, the static elimination roller 51 has an outer diameter of 20 to 25 mm, and an electrical resistance value of the static elimination roller 51 is $1\times10^5$ to $1\times10^8\Omega$ when measured by application of a voltage of 2 kV under the environment of 23° C. and a relative humidity of 50%. A material of the static elimination roller 51 is similar to that of the outer roller 9 described above. The static elimination opposing roller 52 has an outer diameter of 20 to 25 mm, and forms a static elimination nip portion N3 together with the static elimination roller 51.

First, the electrostatic charge on the sheet conveyed from the image forming apparatus 100 is roughly eliminated at the static elimination nip portion N3 of the static elimination roller pair 50. A static elimination voltage, which is a direct voltage with a polarity (negative polarity in the present exemplary embodiment) opposite to a polarity of the secondary transfer member (outer roller 9) and which is controlled to be a constant voltage, is applied to the static elimination roller 51 by a static elimination power source 53. In the present exemplary embodiment, for example, the static elimination voltage of −1 to −7 KV is applied. A switch 54 is arranged in the static elimination apparatus 300, and allows an operator to switch ON/OFF of application of a voltage to the static elimination roller pair 50.

In contrast, the static elimination opposing roller 52 is electrically grounded (connected to the ground).

Subsequently, static electricity on the sheet that has passed the static elimination roller pair 50 is eliminated by the non-contact static elimination section 60 arranged on the downstream side of the static elimination roller pair 50. The non-contact static elimination section 60 eliminates the remaining static charge, which cannot be completely eliminated by the static elimination roller pair 50, from the sheet. In the non-contact static elimination section 60, a non-contact static elimination unit 61 (a first non-contact static elimination unit and an upper side static elimination unit) is arranged above the conveyance path T, and a non-contact static elimination unit 62 (a second non-contact static elimination unit and a lower side static elimination unit) is arranged below the conveyance path T. That is, according to the present exemplary embodiment, in the non-contact static elimination section 60, the non-contact static elimination units 61 and 62 are arranged on the upper and lower sides, respectively, across the conveyance path T. In the present exemplary embodiment, the non-contact static elimination units 61 and 62 include static elimination needles 61*a* and 62*b*, respectively, that generate ion for eliminating static electricity from the sheet, and serve as ionizers that irradiate the sheet with ion to eliminate static electricity. The static elimination needles 61*a* are an example of a first ion discharge unit, and the static elimination needles 62*a* are an example of a second ion discharge unit. However, as the non-contact static elimination units 61 and 62, for example, a non-contact static elimination unit including a static elimination wire may be used.

Furthermore, the non-contact static elimination section 60 includes a guide unit 63 that forms part of the conveyance path T. The guide unit 63 is arranged below the non-contact static elimination unit 61 and above the non-contact static elimination unit 62 in a vertical direction. That is, the guide unit 63 is arranged between the non-contact static elimination unit 61 and the non-contact static elimination unit 62. In the non-contact static elimination section 60, static electricity on the sheet is eliminated by the non-contact static elimination units 61 and 62 when the sheet passes the guide unit 63.

Figure 4:
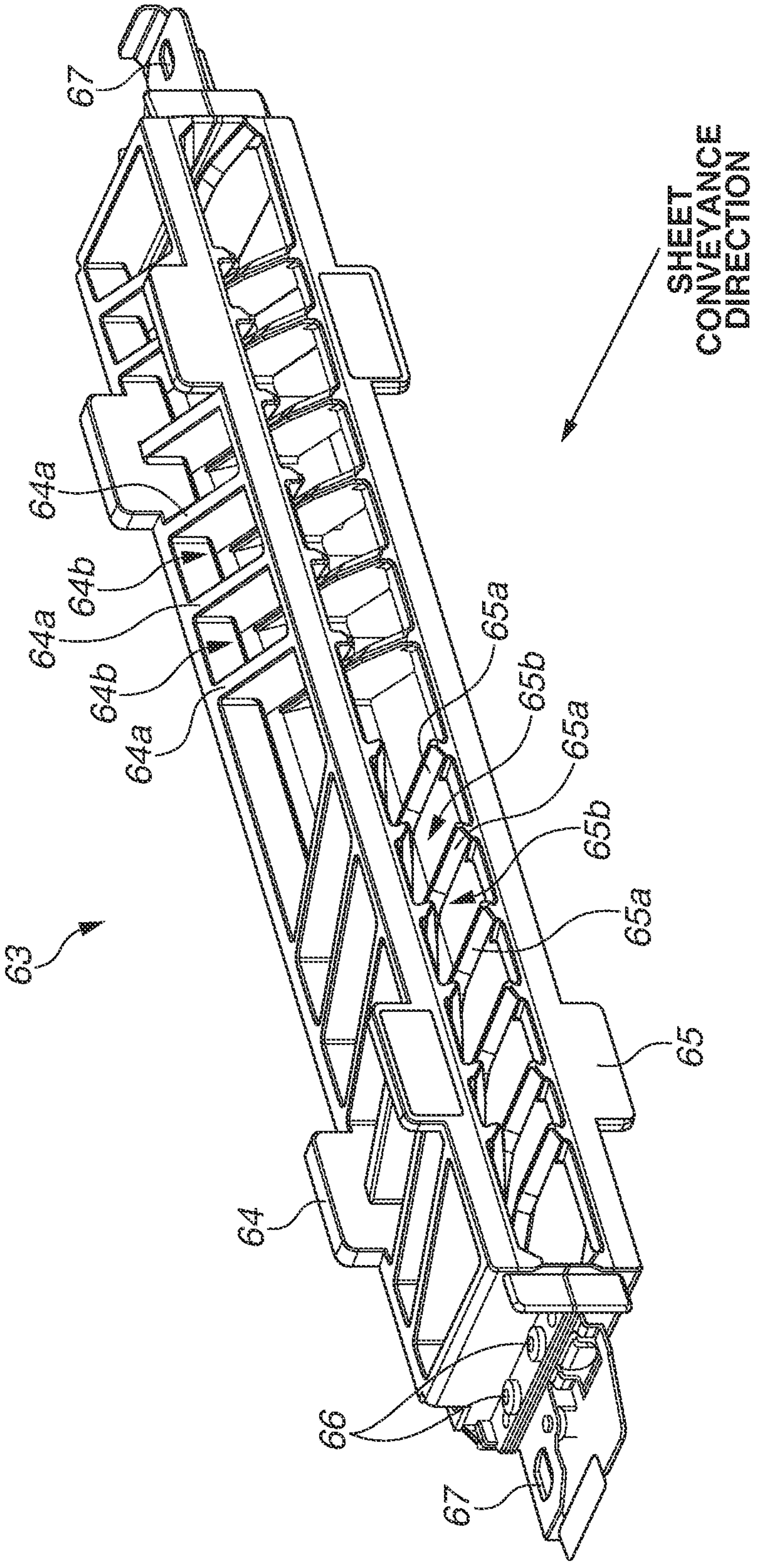
FIG. 4 is a perspective view of a guide unit.

FIG. 4 is a perspective view of the guide unit 63. The guide unit 63 includes an upper side guide member 64 that faces the upper surface of the sheet and that guides the sheet, and a lower side guide member 65 that faces the lower surface of the sheet and that guides the sheet. The lower side guide member 65 forms the conveyance path T with the upper side guide member 64. The sheet that has passed the static elimination roller pair 50 is conveyed between the upper side guide member 64 and the lower side guide member 65. In the present exemplary embodiment, the upper side guide member 64 and the lower side guide member 65 are made of a synthetic resin made of polycarbonate (PC) and acrylonitrile butadiene styrene (ABS), and volume resistivity is $1\times10^{14}$ Ωcm. The upper side guide member 64 and the lower side guide member 65 are fixed to each other with a plurality of screws 66 arranged on both ends in a width direction, and constitute one guide unit 63.

The upper side guide member 64 includes a plurality of guide portions 64*a* arranged next to each other in the width direction, and a plurality of openings 64*b* each formed between the guide portions 64*a*. Each of the plurality of guide portions 64*a* is a rib-shaped portion that extends in a direction that is oblique to the sheet conveyance direction. The plurality of openings 64*b* exposes the static elimination needles 61*a* to the conveyance path T. The lower side guide member 65 includes a plurality of guide portions 65*a* arranged next to each other in the width direction, and a plurality of openings 65*b* each formed between the guide portions 65*a*, similarly to the upper side guide member 64. In FIG. 4, reference signs are added to only some of the plurality of guide portions 64*a* and 65*a* and the plurality of openings 64*b* and 65*b* to avoid complexity of the drawing. In the present exemplary embodiment, the upper side guide member 64 and the lower side guide member 65 have similar shapes.

The guide portions 64*a* of the upper side guide member 64 come in contact with the upper surface of the sheet and guide the sheet. The guide portions 65*a* of the lower side guide member 65 come in contact with the lower surface of the sheet and guide the sheet. Ion emitted from the non-contact static elimination unit 61 passes the openings 64*b* in the upper side guide member 64 and is emitted to the upper surface of the sheet. Ion emitted from the non-contact static elimination unit 62 passes the openings 65*b* in the lower side guide member 65 and is emitted to the lower surface of the sheet. In this manner, the formation of the openings 64*b* and 65*b* in the guide unit 63 prevents ion emitted from the non-contact static elimination units 61 and 62 from being physically blocked and allows the non-contact static elimination section 60 to eliminate static electricity from the sheet.

<Regarding Jam Clearing Processing and Cleaning Performed by Static Elimination Apparatus>

Figure 5:
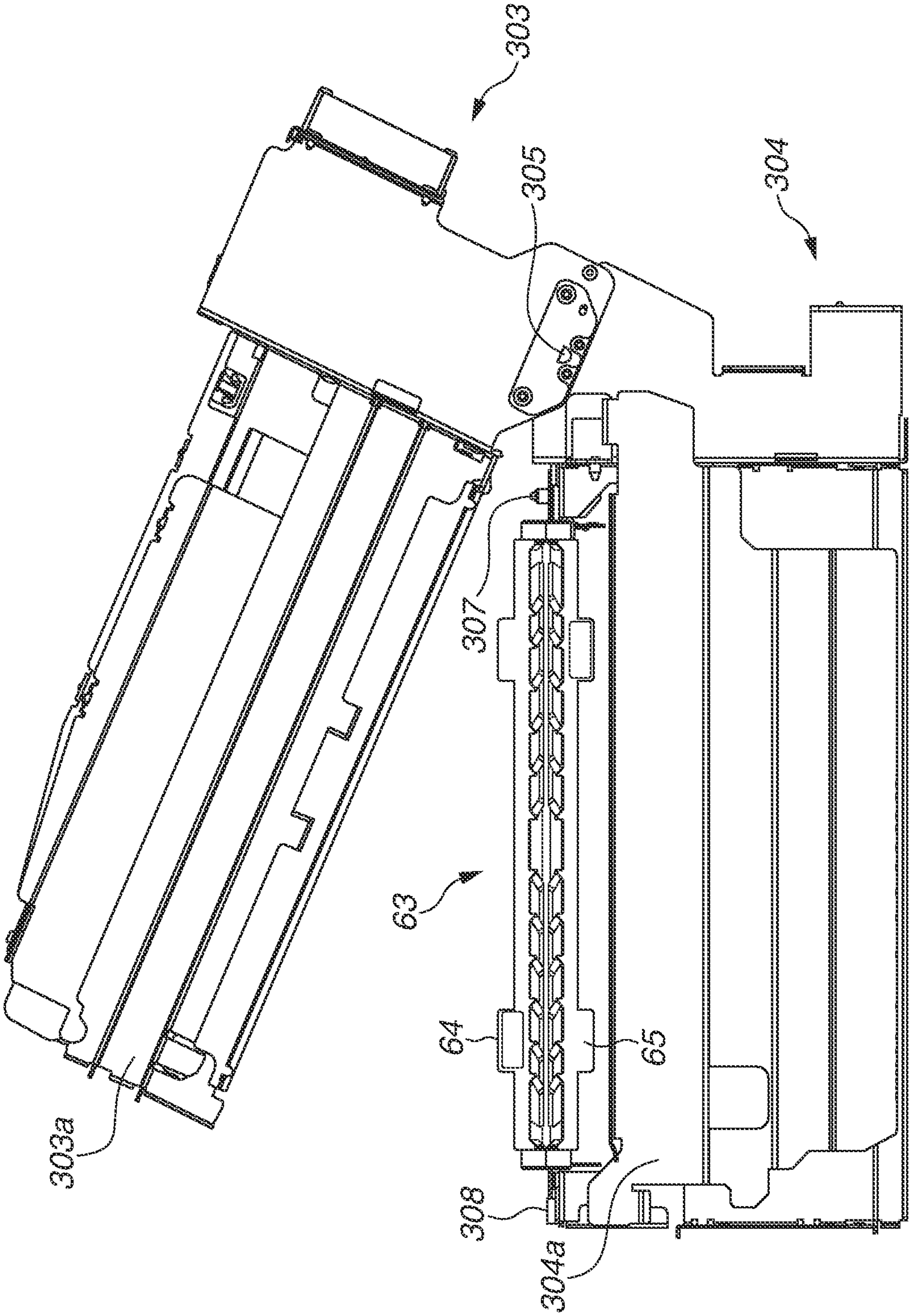
FIG. 5 is a side view illustrating an upper unit and a lower unit in a state where the upper unit is opened.
Figure 6:
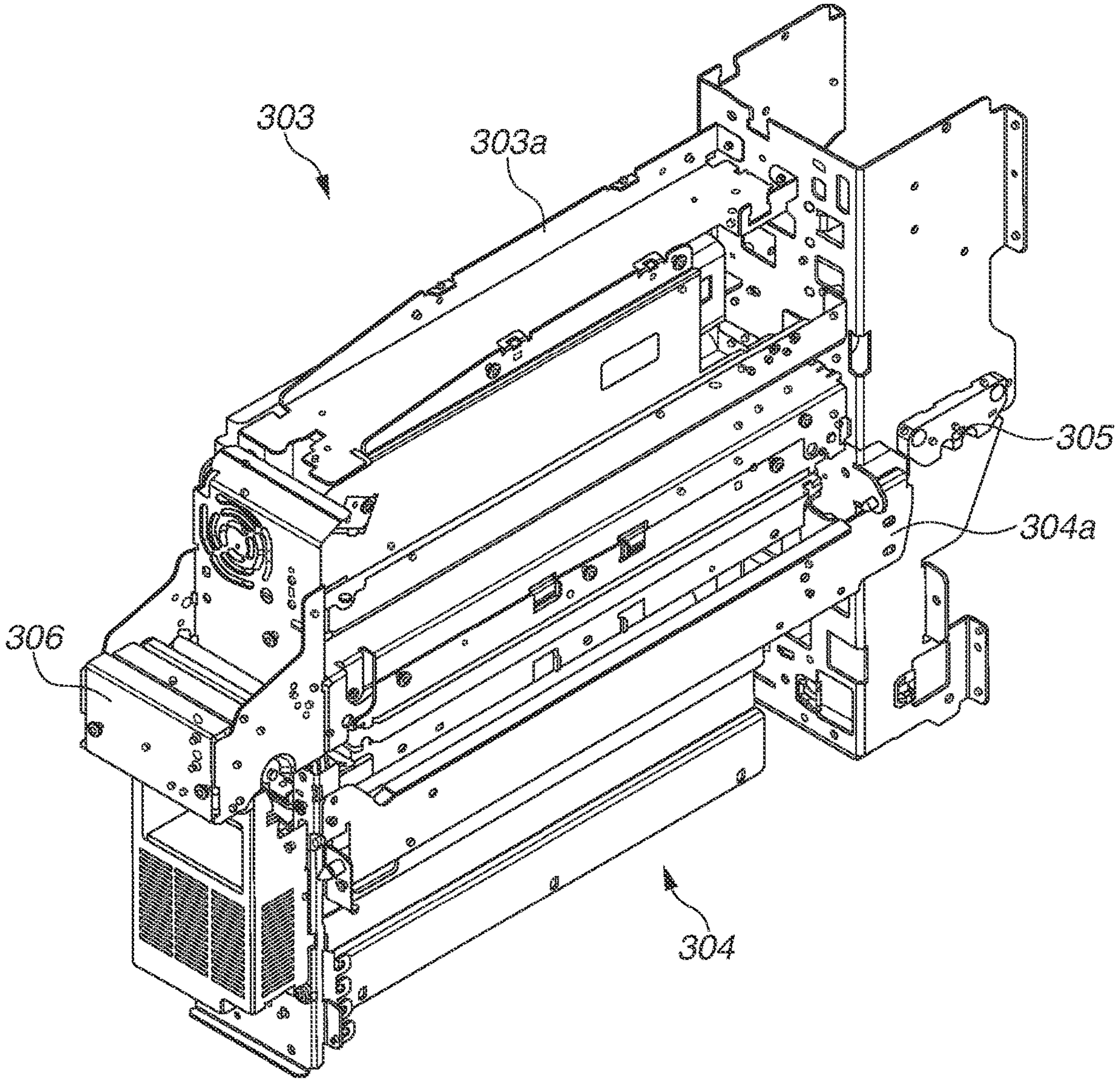
FIG. 6 is a perspective view illustrating the upper unit and the lower unit in a state where the upper unit is closed.
Figure 7:
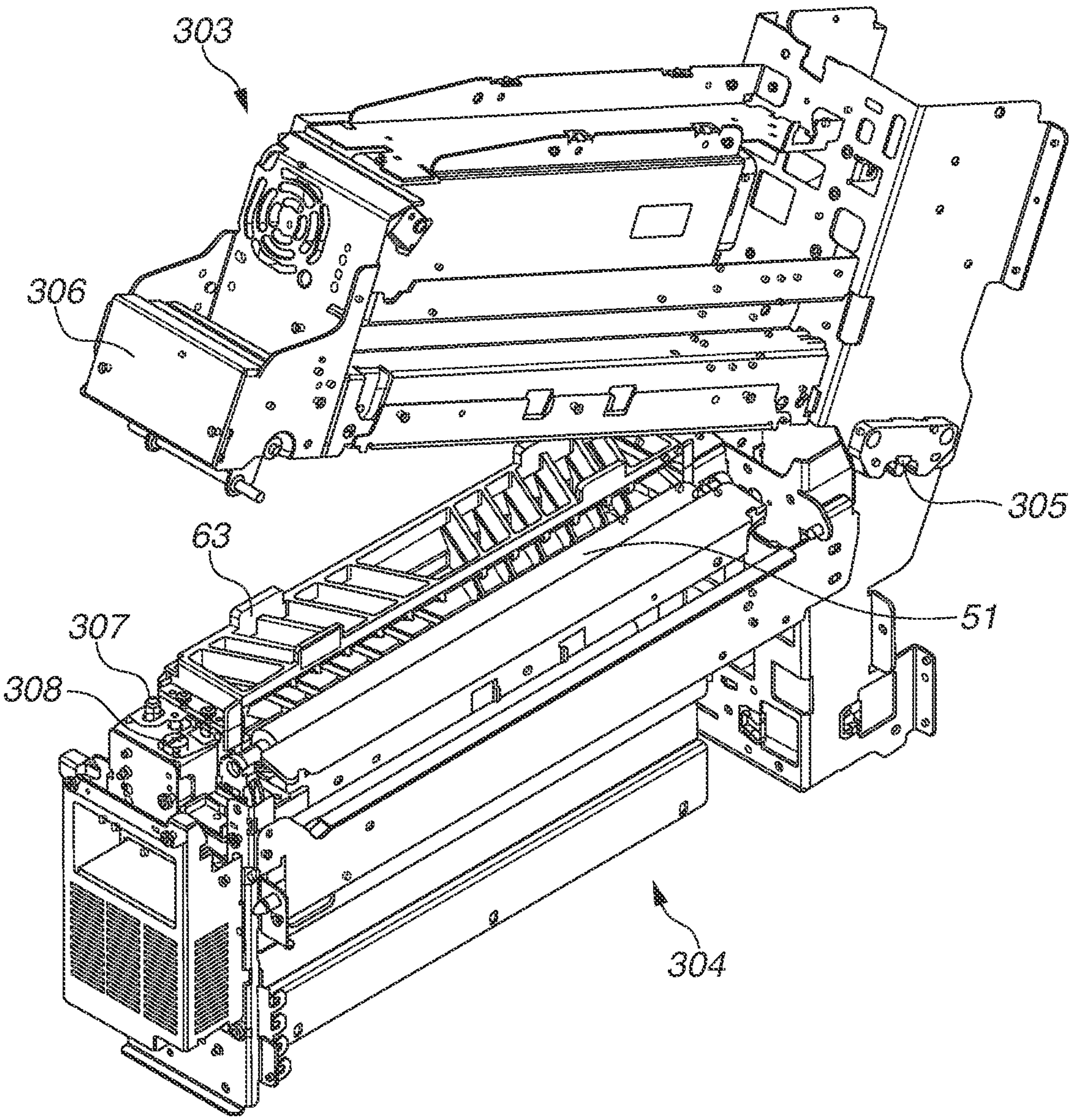
FIG. 7 is a perspective view illustrating the upper unit and the lower unit in the state where the upper unit is opened.
Figure 8:
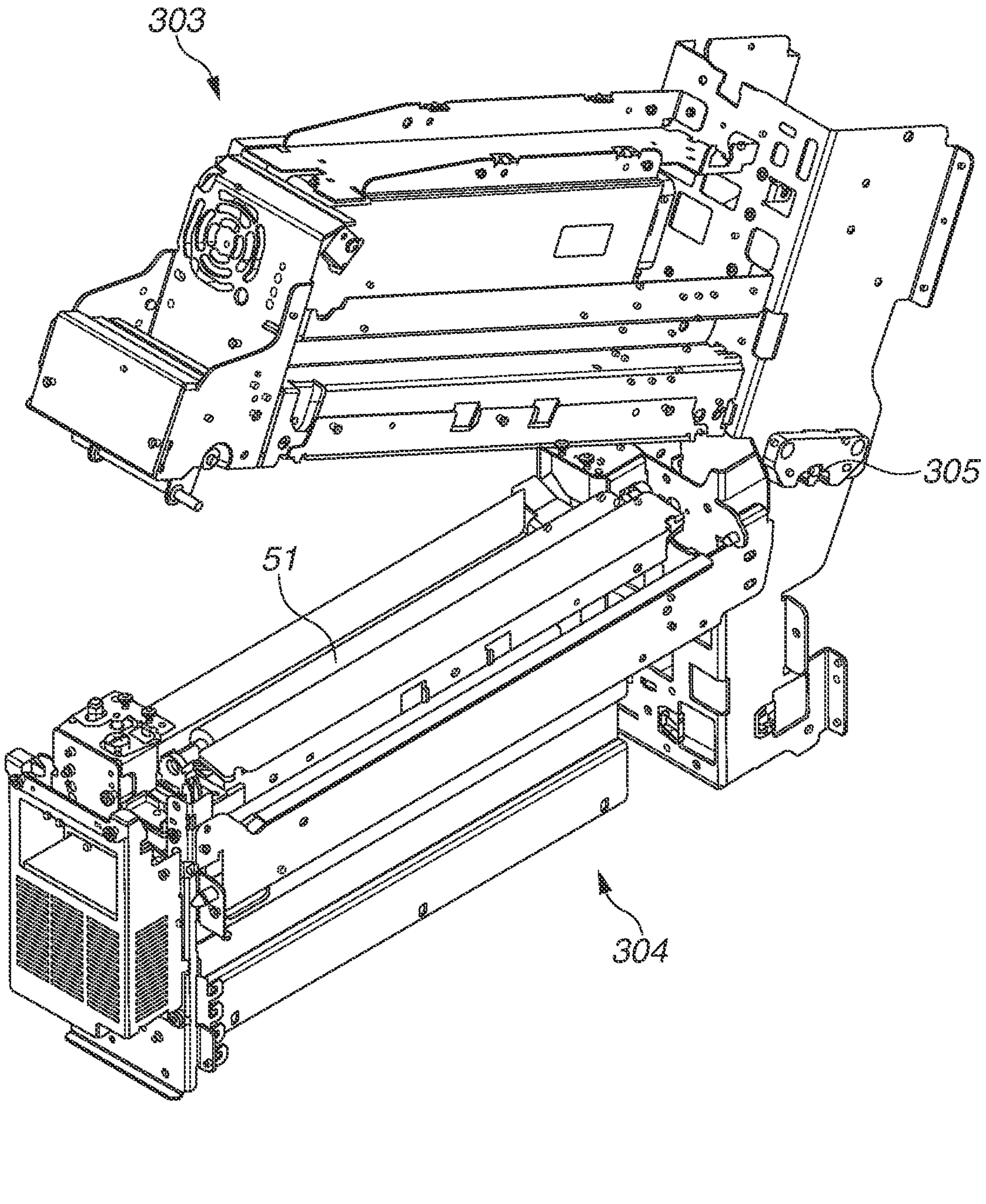
FIG. 8 is a perspective view illustrating the upper unit and the lower unit in a state where the guide unit is removed.

Subsequently, a configuration regarding jam clearing processing and cleaning performed by the static elimination apparatus 300 is now described with reference to FIGS. 3 to 8. FIG. 5 is a side view illustrating an upper unit 303 and a lower unit 304 in a state where the upper unit 303 is opened with respect to the lower unit 304. FIG. 6 is a perspective view illustrating the upper unit 303 and the lower unit 304 in a state where the upper unit 303 is closed with respect to the lower unit 304. FIG. 7 is a perspective view illustrating the upper unit 303 and the lower unit 304 in the state where the upper unit 303 is opened with respect to the lower unit 304. FIG. 8 is a perspective view illustrating the upper unit 303 and the lower unit 304 in a state where the guide unit 63 is removed.

In a case where a jam (paper jam) occurs inside the static elimination apparatus 300, the operator needs to remove the sheet jammed in the conveyance path T of the static elimination apparatus 300. In addition, there is a case where a foreign substance, such as paper dust, adheres to the static elimination needles 61*a* and 62*a*, and static elimination performance of the non-contact static elimination units 61 and 62 decreases. In such a case, it is desirable that cleaning (maintenance) be performed on the non-contact static elimination units 61 and 62. To address this, in the present exemplary embodiment, the conveyance path T of the static elimination apparatus 30 is configured to be exposed for jam clearing processing and cleaning.

The static elimination roller pair 50, the non-contact static elimination section 60, the inlet roller pair 43, the outlet roller pair 44, which have been described above, are housed inside a housing 301, which is an exterior package of the static elimination apparatus 300. Additionally, the static elimination apparatus 300 includes a door 302 (refer to FIG. 1) constituting the front side of the static elimination apparatus 300, and the door 302 is configured to be opened/closed with respect to the housing 301 by an opening/closing mechanism, which is not illustrated. The operator can access the upper unit 303 and the lower unit 304, which will be described below, by opening the door 302.

In the present exemplary embodiment, as illustrated in FIG. 3, the static elimination roller pair 50 and the non-contact static elimination section 60, which have been described above, are arranged in the upper unit 303 (upper side unit) and the lower unit 304 (lower side unit). Specifically, the static elimination opposing roller 52 and the non-contact static elimination unit 61 are arranged in the upper unit 303, and the static elimination roller 51 and the non-contact static elimination unit 62 are arranged in the lower unit 304. In the present exemplary embodiment, the guide unit 63 (the upper side guide member 64 and the lower side guide member 65) is arranged in the lower unit 304.

The upper unit 303 includes an upper housing 303*a* formed of a plate or the like, and the non-contact static elimination unit 61 is fixed to the upper housing 303*a*. The lower unit 304 includes a lower housing 304*a* formed of a plate, and the non-contact static elimination unit 62 is fixed to the lower housing 304*a*. The lower unit 304 is fixed to the housing 301 of the static elimination apparatus 300 so as to be immovable. In contrast, the upper unit 303 is arranged to be pivotable about a rotating shaft 305 with respect to the lower unit 304. As is obvious from FIG. 5, the upper unit 303 is pivotable about the rotating shaft 305 arranged closer to the back surface of the static elimination apparatus 300 than the conveyance path T so that the front surface side of the static elimination apparatus 300 can be exposed. Specifically, the upper unit 303 is provided with a handle 306. The operator opens the door 302, grasps the handle 306, and lifts the upper unit 303 upward so that the upper unit 303 is rotated. Since the upper unit 303 is rotated inside the housing 301, a rotatable range of the upper unit 303 is restricted by a height of a top surface of the housing 301. That is, the upper unit 303 is pivotable in a range from a closed state until the upper housing 303*a* comes in contact with the top surface of the housing 301.

When the upper unit 303 is rotated upward, part of the conveyance path T is exposed as illustrated in FIG. 7. Additionally, the static elimination opposing roller 52 is arranged in the upper unit 303, and the static elimination roller 51 is arranged in the lower unit 304. Hence, when the upper unit 303 is rotated upward, the static elimination opposing roller 52 moves so as to be separated from the static elimination roller 51. In this manner, the upper unit 303 is rotated upward, and part of the conveyance path T, i.e., a portion of the conveyance path T near the static elimination nip portion N3 of the static elimination roller pair 50, is exposed, whereby the operator is able to perform jam clearing processing on the static elimination apparatus 300.

Two protruding portions 307 protruding upward are arranged in the lower unit 304 on respective sides of the conveyance path T in the width direction. Meanwhile, two fitting holes 67 (FIG. 4), to which the respective protruding portions 307 are fitted, are arranged in the guide unit 63 on respective sides of the conveyance path T in the width direction. The two protruding portions 307 are fitted to the respective fitting holes 67, whereby the guide unit 63 is positioned by the lower unit 304. The positioned guide unit 63 is detachably attached to the lower housing 304*a* of the lower unit 304 with a screw 308 as a fixing member. As described above, the guide unit 63 is configured as one unit in which the upper side guide member 64 and the lower side guide member 65 are fixed to each other. Hence, when the upper unit 303 is rotated upward, both the upper side guide member 64 and the lower side guide member 65 remain in the lower unit 304 without moving. In other words, when the upper unit 303 is rotated upward, the upper side guide member 64 and the lower side guide member 65 are separated from the upper unit 303. The guide unit 63 is separated from the upper unit 303, whereby the static elimination needles 61*a* of the non-contact static elimination unit 61 are exposed to the outside of the static elimination apparatus 300. In this manner, the guide unit 63 is separated from the upper unit 303 when the upper unit 303 is rotated upward, whereby the operator is able to clean the static elimination needles 61*a* of the non-contact static elimination unit 61 without removing the guide unit 63.

As illustrated in FIG. 8, the operator is able to remove the guide unit 63 from the lower unit 304 by loosening the screw 308. In a state where the guide unit 63 is removed from the lower unit 304, the static elimination needles 62*a* of the non-contact static elimination unit 62 are exposed to the outside of the static elimination apparatus 300. That is, after rotating the upper unit 303 upward and removing the guide unit 63 from the lower unit 304, the operator is able to clean the static elimination needles 62*a* of the non-contact static elimination unit 62.

To clean the static elimination needles 61*a* of the non-contact static elimination unit 61, the operator first opens the door 302 and rotates the upper unit 303 upward while grasping the handle 306. This allows the operator to access the static elimination needles 51*a*. In addition, to clean the static elimination needles 62*a* of the non-contact static elimination unit 62, the operator rotates the upper unit 303 upward, and thereafter removes the guide unit 63 from the lower unit 304. This allows the operator to access the static elimination needles 62*a*.

As described above, in the present exemplary embodiment, the upper unit 303 including the static elimination opposing roller 52 and the non-contact static elimination unit 62 is configured to be rotated with respect to the lower unit 304 including the static elimination roller 51 and the non-contact static elimination unit 62. The upper unit 303 is rotated upward, whereby part of the conveyance path T is exposed. Such a configuration allows the operator to easily perform the jam clearing processing on the static elimination apparatus 300.

In the present exemplary embodiment, the guide unit 63 is configured to be separated from the upper unit 303 when the upper unit 303 is rotated upward. This allows the operator to clean the static elimination needles 61*a* of the non-contact static elimination unit 61 without removing the guide unit 63.

In the present exemplary embodiment, the description has been given of the configuration in which the vicinity of the static elimination nip portion N3, which is part of the conveyance path T, in the static elimination roller pair 50, is exposed when the upper unit 303 is rotated upward, but the present exemplary embodiment is not limited thereto. For example, when the upper unit 303 is rotated upward, part of the conveyance path T formed by the upper side guide member 64 and the lower side guide member 65 may be exposed. That is, a configuration may be adopted in which the upper side guide member 64 is fixed to the upper unit 303, and the upper side guide member 64 is separated from the lower side guide member 65 when the upper unit 303 is operated upward. That is, at least the lower side guide member 65 is required to be arranged in the lower unit 304. In a case of adopting this configuration, the following configuration may be adopted for cleaning of the static elimination needles 61*a* of the non-contact static elimination unit 61. The configuration is made so that after the upper unit 303 is rotated upward, the upper side guide member 64 arranged in the upper unit 303 is removed from the upper unit 303 so that the static elimination needles 61*a* of the non-contact static elimination unit 61 are exposed.

In the present exemplary embodiment, the description has been given of the configuration in which the lower unit 304 is fixed to the housing 301 so as to be immovable, but the present exemplary embodiment is not limited thereto. For example, a configuration may be adopted in which the lower unit 304 is configured to be rotated downward, and the upper unit 303 and the lower unit 304 are separated from each other.

In the present exemplary embodiment, the description has been given of the configuration in which the inlet roller pair 43 and the outlet roller pair 44 are not separated from each other, but the present exemplary embodiment is not limited thereto. For example, a configuration may be adopted in which respective upper rollers of the inlet roller pair 43 and the outlet roller pair 44 are arranged in the upper unit 303 and are rotated together with the upper unit 303.

Furthermore, in the present exemplary embodiment, the description has been given of the configuration in which the non-contact static elimination units 61 and 62 are arranged on the upper and lower sides of the conveyance path T, respectively, but the present exemplary embodiment is not limited thereto. For example, the static elimination apparatus 300 may have a configuration including only the non-contact static elimination unit 61 on the upper side of the conveyance path T. In the present exemplary embodiment, the description has been given of the static elimination apparatus 300 including both the static elimination roller pair 50 and the non-contact static elimination section 60, but the present exemplary embodiment is not limited thereto. For example, the static elimination apparatus 300 may have a configuration including only either the static elimination roller pair 50 or the non-contact static elimination section 60.

According to the present disclosure, it is possible to facilitate a jam clearance operation on a static elimination apparatus.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-011450, which was filed on Jan. 30, 2023 and which is hereby incorporated by reference herein in its entirety.

What is claimed is:

1. A static elimination apparatus comprising:

a non-contact static elimination unit arranged above a conveyance path through which a sheet is conveyed and configured to eliminate static electricity from the sheet conveyed in a non-contact state;

an upper side guide member arranged so as to face an upper surface of the sheet conveyed and configured to form part of the conveyance path;

a lower side guide member arranged so as to face a lower surface of the sheet conveyed and configured to form the part of the conveyance path together with the upper side guide member;

a lower side unit in which the lower side guide member is arranged; and an upper side unit in which the non-contact static elimination unit is arranged and that is configured to be rotated upward with respect to the lower side unit so as to make at least part of the conveyance path exposed, wherein the upper side guide member is arranged below the non-contact static elimination unit and includes a plurality of openings arranged next to each other in a width direction orthogonal to a sheet conveyance direction.

2. The static elimination apparatus according to claim 1, wherein the upper side guide member is arranged in the lower side unit together with the lower side guide member, and is configured to be separated from the upper side unit when the upper side unit is rotated upward.

3. The static elimination apparatus according to claim 2, wherein the non-contact static elimination unit includes an ion emission unit configured to emit ions to the sheet, and wherein the ion emission unit is exposed to an outside of the static elimination apparatus in a state where the upper side unit is rotated upward.

4. The static elimination apparatus according to claim 1, wherein the non-contact static elimination unit is a first non-contact static elimination unit, and wherein the static elimination apparatus further comprises a second non-contact static elimination unit that is arranged in the lower side unit below the conveyance path, and that is configured to eliminate static electricity from the sheet conveyed in a non-contact state.

5. The static elimination apparatus according to claim 4, wherein the upper side guide member is arranged below the first non-contact static elimination unit and includes a plurality of openings arranged next to each other in the width direction orthogonal to the sheet conveyance direction, and wherein the lower side guide member is arranged above the second non-contact static elimination unit and includes a plurality of openings arranged next to each other in the width direction.

6. The static elimination apparatus according to claim 5, wherein the upper side guide member and the lower side guide member are arranged in the lower side unit, and wherein the upper side guide member and the lower side guide member are configured to be separated from the upper side unit when the upper side unit is rotated upward.

7. The static elimination apparatus according to claim 6, wherein the first non-contact static elimination unit includes a first ion emission unit configured to emit ions to the sheet, and wherein the first ion emission unit is exposed to an outside of the static elimination apparatus in a state where the upper side unit is rotated upward.

8. The static elimination apparatus according to claim 7, further comprising a fixing member configured to fix the upper side guide member and the lower side guide member to the lower side unit, the upper side guide member and the lower side guide member being configured to be detached from the lower side unit, wherein the second non-contact static elimination unit includes a second ion emission unit configured to emit ions to the sheet, and wherein the second ion emission unit is exposed to the outside of the static elimination apparatus in a state where the upper side unit is rotated upward and the upper side guide member and the lower side guide member are removed from the lower side unit.

9. The static elimination apparatus according to claim 1, further comprising a static elimination roller pair including a first static elimination roller arranged in the upper side unit and a second static elimination roller arranged in the lower side unit, and configured to eliminate static electricity from the sheet in a state of being in contact with the sheet conveyed on an upstream side of the non-contact static elimination unit in the sheet conveyance direction, wherein the first static elimination roller is configured to be separated from the second static elimination roller when the upper side unit is rotated upward.

10. The static elimination apparatus according to claim 1, wherein the upper side unit is configured to be rotated about a rotating shaft arranged closer to a back surface of the static elimination apparatus than the conveyance path so that a front surface side of the static elimination apparatus is exposed.

11. An image forming system comprising:

a static elimination apparatus that includes:

a non-contact static elimination unit arranged above a conveyance path through which a sheet is conveyed and configured to eliminate static electricity from the sheet conveyed in a non-contact state, an upper side guide member arranged so as to face an upper surface of the sheet conveyed and configured to form part of the conveyance path, a lower side guide member arranged so as to face a lower surface of the sheet conveyed and configured to form the part of the conveyance path together with the upper side guide member, a lower side unit in which the lower side guide member is arranged, and an upper side unit in which the non-contact static elimination unit is arranged and that is configured to be rotated upward with respect to the lower side unit so as to make at least part of the conveyance path exposed; and an image forming apparatus that includes:

a transfer unit configured to transfer a toner image to the sheet; and a fixing unit configured to heat and press the sheet to which the toner image is transferred by the transfer unit and fix the toner image to the sheet, wherein the static elimination apparatus is arranged on a downstream side of the image forming apparatus and is configured to eliminate static electricity from the sheet on which an image is formed by the image forming apparatus, wherein the upper side guide member is arranged below the non-contact static elimination unit and includes a plurality of openings arranged next to each other in a width direction orthogonal to a sheet conveyance direction.

* * * * *